(12) United States Patent
Zhang et al.

(10) Patent No.: US 10,414,080 B2
(45) Date of Patent: Sep. 17, 2019

(54) INJECTION MOLDING APPARATUS

(71) Applicant: SAINT-GOBAIN GLASS FRANCE, Courbevoie (FR)

(72) Inventors: Shuai Zhang, Shanghai (CN); Xiaofeng Lin, Shanghai (CN); Ping Li, Shanghai (CN); Xiaowei Sun, Shanghai (CN); Xiaoyu Zhao, Shanghai (CN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 382 days.

(21) Appl. No.: 15/117,595

(22) PCT Filed: Apr. 15, 2015

(86) PCT No.: PCT/CN2015/076631
§ 371 (c)(1),
(2) Date: Aug. 9, 2016

(87) PCT Pub. No.: WO2015/158260
PCT Pub. Date: Oct. 22, 2015

(65) Prior Publication Data
US 2016/0354963 A1    Dec. 8, 2016

(30) Foreign Application Priority Data

Apr. 16, 2014  (CN) .................... 2014 2 0184650 U

(51) Int. Cl.
*B29C 45/84*      (2006.01)
*B29C 45/14*      (2006.01)
(Continued)

(52) U.S. Cl.
CPC ...... *B29C 45/842* (2013.01); *B29C 45/14778* (2013.01); *B29C 45/768* (2013.01);
(Continued)

(58) Field of Classification Search
CPC ............... B29C 45/842; B29C 45/768; B29C 45/14778; B29C 2945/76471;
(Continued)

(56) References Cited

U.S. PATENT DOCUMENTS 4,957,670 A    9/1990  Myers et al.

FOREIGN PATENT DOCUMENTS

CN      102645437 A      8/2012
CN      103587029 A      2/2014
(Continued)

OTHER PUBLICATIONS

JP2003048233 translation (Year: 2003).*
(Continued)

*Primary Examiner* — Joseph S Del Sole
*Assistant Examiner* — Mohamed K Ahmed Ali
(74) *Attorney, Agent, or Firm* — Pillsbury Winthrop Shaw Pittman LLP

(57) ABSTRACT

An injection molding apparatus for forming a gasket around an edge of a glass is provided. The injection molding apparatus includes: an injection mold die; a fixing component, disposed inside the injection mold die and adapted for fixing the glass inside the injection mold die; a detection unit, mounted to the injection molding apparatus and adapted for detecting an image or vibration of the glass; a determination unit, coupled with the detection unit and adapted for determining whether the glass breaks based on a detection result of the detection unit. The apparatus can determine whether the glass breaks, such that the risk of scratching the injection mold die by glass breaking may be reduced. Therefore, the injection molding yield can be improved, the time for repairing the injection mold die may be reduced and a service life of the injection mold die may be prolonged.

5 Claims, 5 Drawing Sheets

(51) Int. Cl.
*B29C 45/76* (2006.01)
*B29L 31/26* (2006.01)
*B29L 31/30* (2006.01)
*B29K 709/08* (2006.01)

(52) U.S. Cl.
CPC ............... *B29C 2945/76163* (2013.01); *B29C 2945/76461* (2013.01); *B29C 2945/76464* (2013.01); *B29C 2945/76471* (2013.01); *B29K 2709/08* (2013.01); *B29L 2031/26* (2013.01); *B29L 2031/265* (2013.01); *B29L 2031/3052* (2013.01)

(58) Field of Classification Search
CPC ........... B29C 2945/76464; B29C 2945/76163; B29C 2945/76461; B29L 2031/265; B29L 2031/3052; B29L 2031/26; B29K 2709/08
See application file for complete search history.

(56) References Cited

FOREIGN PATENT DOCUMENTS

| | | |
|---|---|---|
| CN | 203831672 U | 9/2014 |
| JP | 2003-048233 A | 2/2003 |
| JP | 2011-002276 A | 1/2011 |

OTHER PUBLICATIONS

International Search Report and the Written Opinion of the International Searching Authority as issued in International Patent Application No. PCT/CN2015/076631, dated Jun. 12, 2015.

\* cited by examiner

INJECTION MOLDING APPARATUS

CROSS-REFERENCE TO RELATED APPLICATIONS

This application is the national phase of International Application No. PCT/CN2015/076631, filed on Apr. 15, 2015, which claims the benefit of priority to Chinese patent application No. 201420184650.1, filed on Apr. 16, 2014, and entitled "INJECTION MOLDING APPARATUS", and the entire disclosure of which is incorporated herein by reference.

TECHNICAL FIELD

The present disclosure generally relates to glass technology field, and more particularly, to an injection molding apparatus for forming a gasket around an edge of a glass.

BACKGROUND

Glass gasket can enhance sealing between a glass and a vehicle bodywork, reduce noises, and improve safety and appearance of the glass.

A vehicular rear triangular window assembly is shown in FIG. 1. The vehicular rear triangular window assembly includes: a glass 11 and a gasket 12 formed around an edge of the glass 11. The gasket 12 includes a glue surface 121, a lip 122 and a groove 123 for accommodating glue. The groove 123 is formed in the glue surface 121 and adapted for preventing the glass glue from flowing transversely during coating, so as to avoid a glue leak. The lip 122 is sheet-shaped and can deform when it is squeezed. The gasket 12 is generally formed by an injection molding process.

Specifically, the injection molding process includes: disposing the glass 11 inside an injection mold die; plasticizing a raw material into liquid plastic; injecting the liquid plastic into a cavity inside the injection mold die; and cooling and curing the liquid plastic in the cavity of the injection mold die. In this way, the gasket 12 having a shape matched with that of the cavity of the injection mold die is formed.

However, during closing the injection mold die, the glass inside the injection mold die may be crushed if the glass is not located at a right position, or a pressure of closing the injection mold die is too high.

When the liquid plastic is injected into the injection mold die, the broken glass may slide with the flow of the liquid plastic, and possibly scratch an inner side of the injection mold die. Using an injection mold die with scratches to form a gasket, defects may be formed on a surface of the gasket, which reduces the injection molding yield.

SUMMARY

An injection molding apparatus is provided, which can determine whether a glass in an injection mold die breaks, such that the risk of scratching the injection mold die by glass breaking may be reduced, and the injection molding yield may be improved.

In an embodiment, an injection molding apparatus for forming a gasket around an edge of a glass is provided. The injection molding apparatus includes: an injection mold die; at least one fixing component, disposed inside the injection mold die and adapted for fixing the glass inside the injection mold die; a detection unit, mounted to the injection mold die or on the at least one fixing component, and adapted for detecting an image or vibration of the glass; and a determination unit, coupled with the detection unit and adapted for determining whether the glass breaks based on a detection result of the detection unit.

In some embodiments, the detection unit may include: a light source, disposed inside the injection mold die and adapted for illuminating the glass; and an image sensor, adapted for obtaining an image of the glass illuminated by the light source, wherein the determination unit is coupled with the image sensor, so as to determine whether the glass breaks based on the image of the glass.

In some embodiments, the light source and the image sensor may be disposed on a same side of the glass, and the image sensor may be adapted for obtaining the image of the glass based on lights reflected by the glass.

In some embodiments, the light source and the image sensor may be disposed on different sides of the glass, and the image sensor may be adapted for obtaining the image of the glass based on lights penetrating through the glass.

In some embodiments, the injection mold die may include an upper die half above the glass and a lower die half below the glass, wherein one of the upper die half and the lower die half is configured with a through hole, the image sensor has one end disposed inside the injection mold die and the other end disposed through the through hole and coupled with the determination unit, and the light source is disposed on an inner wall of one of the upper die half and the lower die half, the inner wall facing a cavity of the injection mold die.

In some embodiments, a plurality of light sources may be arranged on the inner wall, wherein the light sources are evenly distributed around the through hole.

In some embodiments, the light source may be a light emitting diode (LED) and the image sensor may be a camera.

In some embodiments, the detection unit may be a vibration sensor, and the determination unit may be coupled with the vibration sensor and adapted for determining whether the glass breaks based on whether the vibration detected by the vibration sensor matches with a vibration of glass breaking.

In some embodiments, the vibration sensor may include piezoelectric ceramic.

In some embodiments, the fixing component may include a suction cup for sucking the glass disposed thereon, and the vibration sensor may be disposed at a position on the suction cup attached with the glass.

In some embodiments, the fixing component may further include a sealing strip surrounding the suction cup, the sealing strip may be adapted for supporting the glass, and the vibration sensor may be disposed on the sealing strip.

In some embodiments, the vibration sensor may be disposed on an inner wall or an outer wall of the injection mold die.

In some embodiments, the detection unit may be an acoustic sensor, and the determination unit may be coupled with the acoustic sensor and adapted for determining whether the glass breaks based on whether a sound detected by the acoustic sensor matches with a sound of glass breaking.

In some embodiments, the injection mold die may include: an upper die half above the glass and a lower die half below the glass, wherein one of the upper die half and the lower die half is configured with a through hole, and the acoustic sensor has one end disposed inside the injection mold die and the other end disposed through the through hole and coupled with the determination unit.

In some embodiments, a sound insulation layer may be filled in an end portion of the through hole, wherein the end portion is far away from a cavity of the injection mold die.

In some embodiments, the injection molding apparatus may further include an ambient sound detector disposed outside of the injection mold die and adapted for detecting ambient sound, wherein the determination unit is coupled with both the acoustic sensor and the ambient sound detector, and adapted for determining whether the glass breaks based on the difference between signals detected by the acoustic sensor and the ambient sound detector.

In some embodiments, the detection unit may be adapted for outputting an electric signal, and the determination unit may include: a receiver, coupled with the detection unit, and adapted for receiving the electric signal and forming a time domain electric signal based on the received electric signal; a converter, coupled with the receiver, and adapted for converting the time domain electric signal into a frequency domain electric signal; and a comparator, coupled with the converter, and adapted for generating an alarm when the frequency domain electric signal is determined to be matched with a feature frequency and a feature amplitude of a signal generated when the glass breaks.

Embodiments of the present disclosure may have following advantages. The image or vibration of the glass is detected by the detection unit, and whether the glass breaks is determined by the determination unit based on the detection result of the detection unit. In this way, whether the glass disposed inside the injection mold die breaks is determined, such that the injection molding process may be terminated in time when it is determined that the glass breaks, the risk of scratching the injection mold die by broken glass may be reduced, the time for repairing the injection mold die may be reduced, and a service life of the injection mold die may be prolonged.

Further, the image of the glass is detected, and whether the glass breaks is determined based on the image of the glass. The detection result is visible, and the detection unit is relatively simple and doesn't need to directly contact with the glass, which brings almost no influence on a surface of the glass, and further improves the injection molding yield.

DETAILED DESCRIPTION

In an embodiment, an injection molding apparatus for forming a gasket around an edge of a glass is provided. The apparatus includes: an injection mold die; at least one fixing component, disposed inside the injection mold die and adapted for fixing the glass inside the injection mold die; a detection unit, mounted to the injection mold die or on the at least one fixing component, and adapted for detecting an image or vibration of the glass; and a determination unit, coupled with the detection unit and adapted for determining whether the glass breaks based on a detection result of the detection unit.

In embodiments of the present disclosure, the image or vibration of the glass is detected by the detection unit, and whether the glass breaks is determined by the determination unit based on the detection result of the detection unit. In this way, whether the glass disposed inside the injection mold die breaks is determined, such that an injection molding process may be terminated in time when it is determined that the glass breaks, the risk of scratching the injection mold die by broken glass may be reduced, the time for repairing the injection mold die may be reduced, and a service life of the injection mold die may be prolonged.

The above objects, characteristics and advantages of the disclosure may be better understood by referring to the following description in conjunction with accompanying figures.

Figure 1:
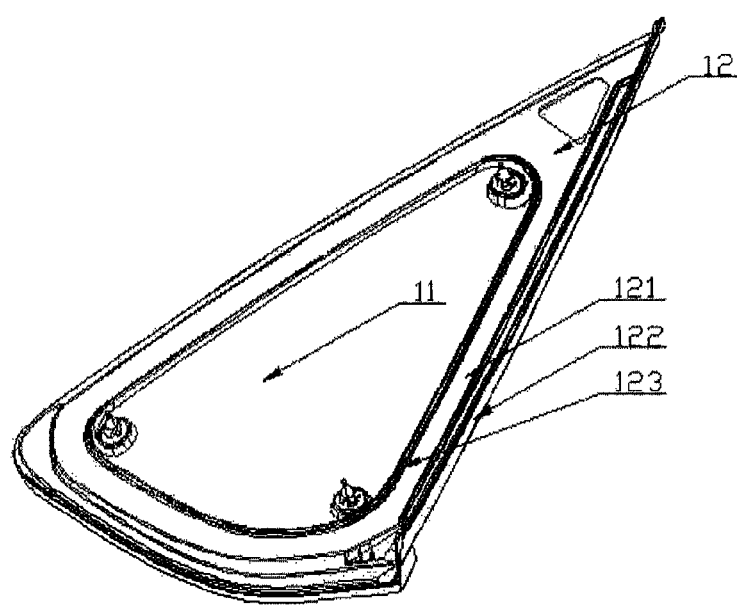
FIG. 1 schematically illustrates a vehicular rear triangular window assembly in existing techniques.
Figure 2:
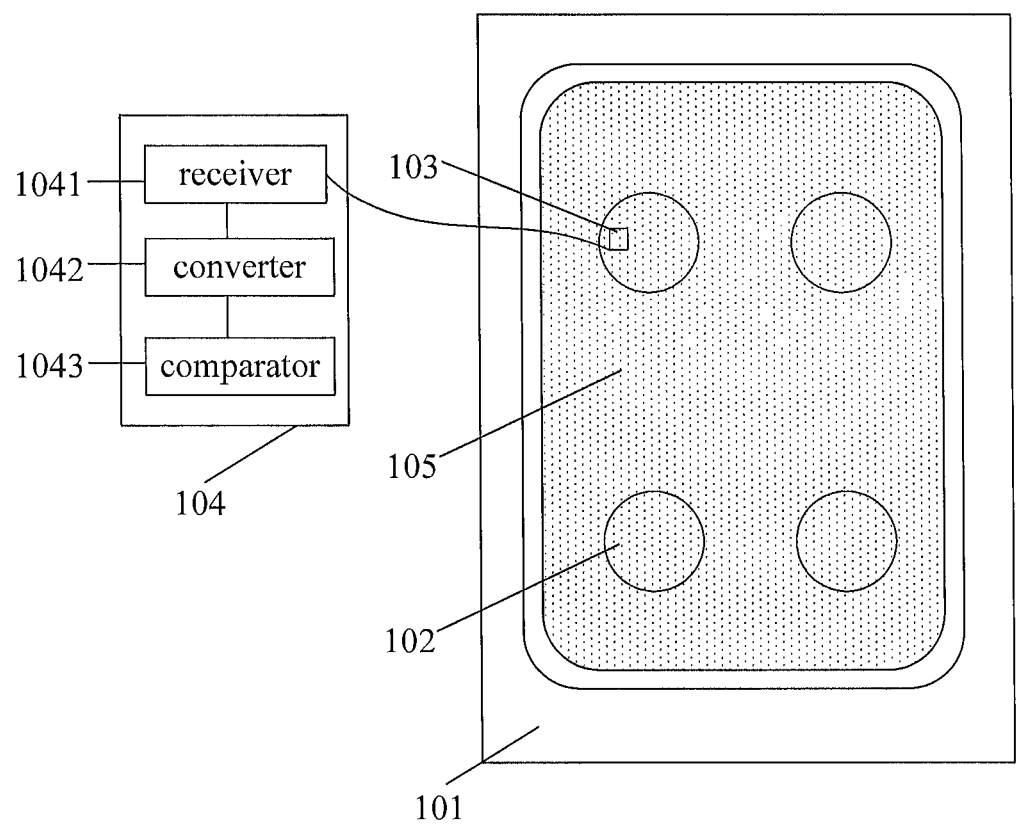
FIG. 2 schematically illustrates a diagram of an injection molding apparatus according to an embodiment of the present disclosure.

FIG. 2 schematically illustrates a diagram of an injection molding apparatus according to an embodiment of the present disclosure. The injection molding apparatus includes an injection mold die 101, a plurality of fixing components 102, a detection unit 103, and a determination unit 104.

The injection mold die 101 is adapted for forming a gasket around an edge of a rectangular glass 105 which has circular corners.

The plurality of fixing components 102 are disposed inside the injection mold die 101. In some embodiments, the fixing components 102 may be suction cups for sucking and supporting the glass 105, such that the glass 105 is fixed inside the injection mold die 101. In FIG. 2, the fixing components 102 include four suction cups for sucking and fixing the glass 105 evenly.

The detection unit 103 is adapted for detecting vibration of the glass 105. In some embodiments, the detection unit 103 may be a vibration sensor and adapted for converting the vibration of the glass 105 into an electric signal. The electric signal has an amplitude and frequency which correspond to an amplitude and frequency of the vibration of the glass 105. In some embodiments, the vibration generated when the glass 105 breaks has a particular amplitude and frequency. Accordingly, the vibration sensor may be adapted for converting the vibration generated when the glass 105 breaks into an electric signal having a feature frequency and a feature amplitude.

Figure 3:
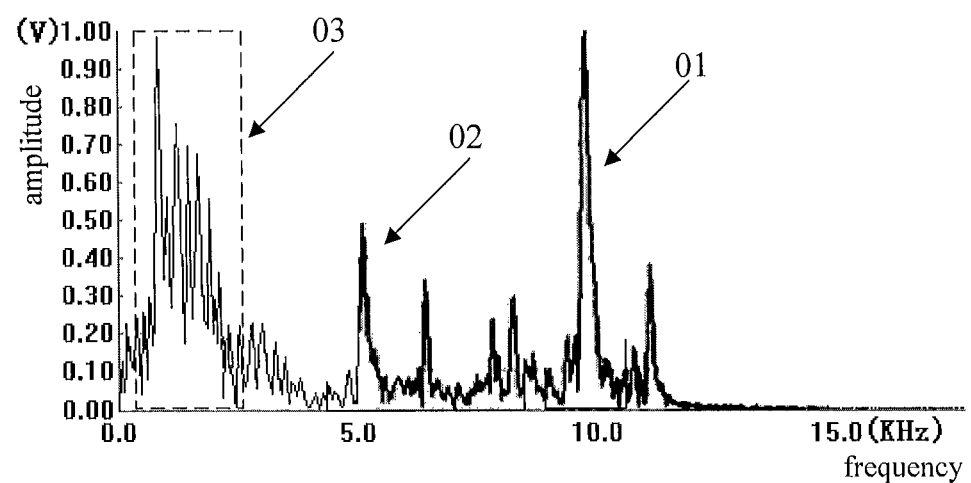
FIG. 3 schematically illustrates a diagram of a detection result obtained by a detection unit in FIG. 2.

FIG. 3 schematically illustrates a diagram of a detection result obtained by the detection unit 103 in FIG. 2. In FIG. 3, horizontal coordinates are frequency of electric signals obtained by the detection unit 103, and vertical coordinates are corresponding amplitudes of the electric signals. The electric signals include an electric signal 01 which corresponds to a vibration of closing the injection mold die, an electric signal 02 which corresponds to a vibration of the injection molding apparatus, and an electric signal 03 (shown with a dotted box) which corresponds to a to vibration of glass breaking. The electric signal 03 has different frequency and amplitude with those of the electric signal 01 and those of the electric signal 02.

In some embodiments, the vibration sensor may include piezoelectric ceramic, such as $PbZr_xTi_{1-x}O_3$. The piezoelectric ceramic has high sensitivity, which is helpful to detect vibration of glass, and is relatively cheap. In some embodiments, the vibration sensor may include other materials, such as a crystalloid which can detect vibration as well.

In some embodiments, the detection unit 103 may be adapted for repeatedly detecting vibration of the glass 105 in a die closing process, an injection molding process and a die opening process, to obtain information about whether the glass 105 breaks for many times, which may further reduce the risk of scratching the injection mold die by the glass breaking.

In some embodiments, the detection unit 103 may be adapted for detecting vibration of the glass 105 in a fixed frequency. The fixed frequency cannot be too high or too low. If the fixed frequency is too low, whether the glass breaks cannot be detected in time, which may result in scratch of the injection mold die. If the fixed frequency is too high, the manufacturing cost of the detection unit 103 may be relatively high, and the requirement on the determination unit 104 may be too strict because of too much information obtained by the frequent detection. In some embodiments, the fixed frequency may be within a range from 20 Hz to 20 KHz. For example, the detection unit 103 may be adapted for detecting vibration of the glass 105 in frequency of 20 Hz, 10 KHz or 20 KHz.

In some embodiments, the injection mold die may include a controller coupled with the detection unit 103, for example, a computer. The controller may be adapted for controlling closing of the injection mold die 101, and repeatedly triggering the detection unit 103 (for example, using a trigger signal to trigger) to perform detection during the closing of the injection mold die 101. In some embodiments, the controller may be further adapted for controlling the procedure of the injection molding process; and repeatedly triggering the detection unit 103 to perform detection in the die closing process, the injection molding process and the die opening process, respectively.

In some embodiments, the vibration sensor may be disposed on the fixing component 102. In some embodiments, the vibration sensor may be disposed at a position on the suction cup attached with the glass 105, such that the vibration sensor can be in close contact with the glass 105, such that the vibration sensor can detect the vibration of the glass 105 accurately when the glass 105 vibrates. Besides, the vibration sensor may not loosen when the glass 105 vibrates.

Referring to FIG. 2, the piezoelectric ceramic may have a size less than a half of a size of the suction cup, and be disposed on an edge region of the suction cup. There is a cavity between a central region of the suction cup and the glass 105, and thus the glass 105 can be absorbed to the suction cup by evacuating the cavity. The edge region of the suction cup may be a region in the closest contact with the glass 105. Therefore, by disposing the piezoelectric ceramic on the edge region of the suction cup, the vibration sensor may be attached with the glass 105 closely.

The determination unit 104 may be coupled with the vibration sensor, and adapted for determining whether the glass 105 breaks based on whether the vibration detected by the vibration sensor matches with a vibration of glass breaking.

A feature frequency and a feature amplitude of an electric signal which corresponds to vibration generated when the glass 105 breaks are pre-stored in the determination unit 104. The determination unit 104 may be adapted for determining that the glass 105 breaks when an electric signal generated by the vibration sensor matches with the feature frequency and the feature amplitude.

Referring to FIG. 3, the electric signal 03 has different frequency and amplitude with those of the electric signal 01 and those of the electric signal 02. Based on this point, the determination unit 104 pre-stores the feature frequency and the feature amplitude which correspond to the electric signal 03. When the electric signal obtained by the detection unit 103 matches with the feature frequency and the feature amplitude, the determination unit 104 may determine that the glass 105 breaks.

Referring to FIG. 2, the determination unit 104 includes a receiver 1041, coupled with the vibration sensor, and adapted for receiving the electric signal generated by the vibration sensor and forming a time domain electric signal based on the received electric signal; a converter 1042, coupled with the receiver 1041, and adapted for converting the time domain electric signal into a frequency domain electric signal; and a comparator 1043, coupled with the converter 1042, and adapted for determining that the glass 105 breaks when the frequency domain electric signal is determined to be matched with the feature frequency and the feature amplitude of the vibration generated when the glass 105 breaks.

In some embodiments, the converter 1042 may be a Fourier transformation converter which can convert the time domain electric signal into the frequency domain electric signal.

In some embodiments, the comparator 1043 may be adapted for generating an alarm when it is determined that the glass 105 breaks, to issue a timely warning.

In some embodiments, the comparator 1043 may be coupled with an alarm bell, and adapted for sending an alarm signal to the alarm bell when the glass 105 breaks, to enable the alarm bell to generate an alarm in sound. In some embodiments, the comparator 1043 may be coupled with an alarm lamp, and adapted for sending an alarm signal to the alarm lamp when the glass 105 breaks, to enable the alarm lamp to generate an alarm in light.

In some embodiments, the receiver 1041, the converter 1042 and the comparator 1043 may be integrated together. In some embodiments, the to determination unit 104 may be an oscilloscope or a computer, and the receiver 1041, the converter 1042 and the comparator 1043 may be integrated in the oscilloscope or the computer.

Figure 4:
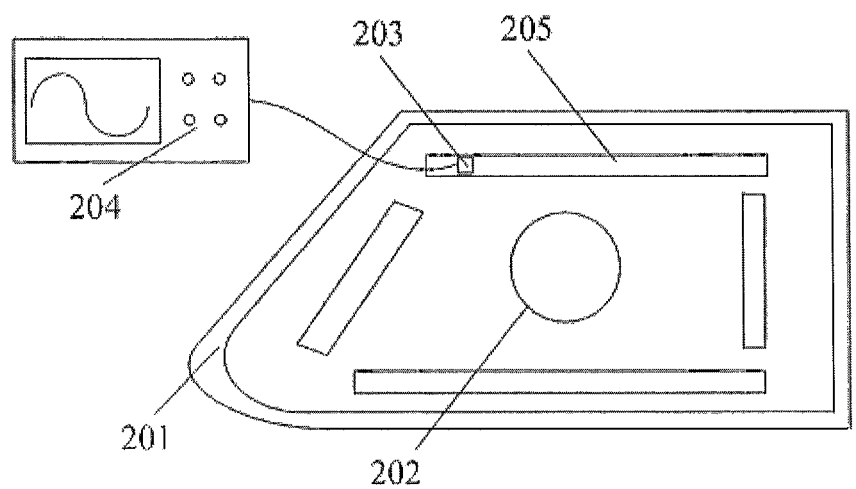
FIG. 4 schematically illustrates a diagram of an injection molding apparatus according to an embodiment of the present disclosure.

FIG. 4 schematically illustrates a diagram of an injection molding apparatus according to an embodiment of the present disclosure. Structures similar with FIG. 2 are not described in detail here. The difference between the injection molding apparatuss in FIG. 4 and FIG. 2 is described as follows.

A fixing component not only includes a suction cup 202 but also includes at least one sealing strip 205. The at least one sealing strip 205 may be disposed in an injection mold die 201 and around the suction cup 202, and adapted for supporting a glass (not shown in FIG. 4).

In some embodiments, a vibration sensor 203 may be disposed on the sealing strip 205. When the glass is disposed inside the injection mold die 201, the sealing strip 205 may contact with the glass to support the glass. As disposed on the sealing strip 205, the vibration sensor 203 can detect vibration of the glass to obtain an electric signal corresponding to vibration generated when the glass breaks.

In some embodiments, a determination unit 204 may be an oscilloscope which is adapted for displaying the electric signal obtained by the vibration sensor 203 in real time, to further detect whether the glass breaks. In some embodiments, the oscilloscope may be further adapted for generating an alarm when the electric signal obtained by the vibration sensor 203 is determined to be matched with a feature frequency and a feature amplitude of vibration generated when the glass breaks.

It should be noted that, a detailed position of the vibration sensor is not limited in embodiments of the present disclosure. The vibration sensor should be disposed in a position where the detection for vibration of the glass can be performed. In some embodiments, the vibration sensor may be disposed on an inner side or an outer side of the injection mold die.

Figure 5:
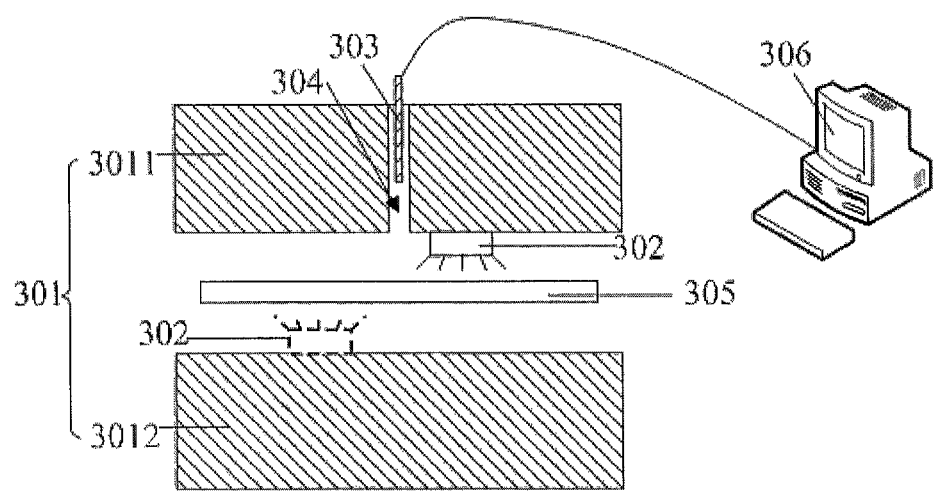
FIG. 5 schematically illustrates a diagram of an injection molding apparatus according to an embodiment of the present disclosure.

FIG. 5 schematically illustrates a diagram of an injection molding apparatus according to an embodiment of the present disclosure. Structures similar with FIG. 2 are not described in detail here. The difference between the injection molding apparatuss in FIG. 5 and FIG. 2 includes: detecting an image of a glass 305 to determine whether the glass breaks. The detailed difference is described as follows.

In FIG. 5, a detection unit includes: a light source 302, disposed in an injection mold die 301, and adapted for illuminating the glass 305; and an image sensor 303, adapted for obtaining an image of the glass 305 illuminated by the light source 302, wherein a determination unit 306 is coupled with the image sensor 303, so as to determine whether the glass 305 breaks based on the image of the glass 305.

The injection mold die 301 includes an upper die half 3011 above the glass 305 and a lower die half 3012 below the glass 305, wherein the upper die half 3011 is configured with a through hole 304.

The light source 302 and the image sensor 303 may be mounted inside the injection mold die 301. In some embodiments, the light source 302 is disposed on an inner wall of the upper die half 3011, the inner wall facing a cavity of the injection mold die 301. The image sensor 303 has one end disposed inside the through hole 304 of the upper die half 3011 and the other end disposed through the through hole 304 and coupled with the determination unit 306. Light irradiated by the light source 302 illuminates a surface of the glass 305, and is reflected by the glass 305. The image sensor 303 may be adapted for receiving the reflected light and forming the image of the glass 305 based on the reflected light.

If the glass 305 is complete, most of the light irradiated by the light source 302 can penetrate through the glass 305 and reflection hardly occurs. Accordingly, the image of the glass 305 obtained by the image sensor 303 has relatively low brightness. If the glass 305 is broken, the light irradiated by the light source 302 may be reflected by cracks on the broken glass 305. Accordingly, the image sensor to 303 may obtain an image having bright strips therein, wherein the bright strips are formed by reflection of the cracks.

In some embodiments, the image sensor 303 may be adapted for repeatedly obtaining the image of the glass 305 illuminated by the reflected light or transmitted light of the light source 302 in a die closing process, an injection molding process and a die opening process, respectively, to detect whether the glass 305 breaks.

In some embodiments, the detection unit 306 may be adapted for determining whether the glass 305 breaks by comparing a current image of the glass 305 with a previous image of the glass 305. In some embodiments, the detection unit 306 may be adapted for determining whether the glass 305 breaks by determining whether the brightness of the image of the glass 305 obtained by the image sensor 303 matches with the brightness of an image of the glass 305 obtained when the glass 305 breaks.

In some embodiments, the light source 302 may be a LED, the image sensor may be a camera (for example, a mini-camera), and the determination unit 306 may be a computer.

In the above embodiment, the through hole 304 is disposed in the upper die half 3011, the light source 302 is disposed on the inner wall of the upper die half 3011, the inner wall facing the cavity of the injection mold die 301, and the image sensor 303 has one end disposed inside the through hole 304. However, in some embodiments, a through hole may be disposed in the lower die half 3012, the light source 302 may be disposed on an inner wall of the lower die half 3012, the inner wall facing the cavity of the injection mold die 301, and the image sensor 303 has one end disposed inside the through hole of the lower die half 3012, and is adapted for obtaining the image of the glass 305 based on light irradiated by the light source 302 and reflected by the glass 305.

Still referring to FIG. 5, in some embodiments, the light source 302 and the image sensor 303 may be disposed on different sides of the glass 305. In some embodiments, the light source 302 may be disposed on the inner wall of the lower die half 3012, the inner wall facing the cavity of the injection mold die 301, and the image sensor 303 may have one end disposed inside the through hole 304 of the upper die half 3011, and be adapted for obtaining the image of the glass 305 based on light irradiated by the light source 302 and penetrating through the glass 305.

If the glass 305 is complete, most of the light irradiated by the light source 302 can penetrate through the glass 305 and reflection hardly occurs. Accordingly, the image of the glass 305 obtained by the image sensor 303 has relatively high brightness. If the glass 305 is broken, the light irradiated by the light source 302 may be reflected by cracks on the broken glass 305, and not penetrate through the glass 305. Accordingly, the image sensor 303 may obtain an image having dark strips therein, wherein the dark strips are formed due to failure of light transmission caused by the cracks.

In some embodiments, the lower die half 3012 may be configured with a through hole, the light source 302 may be disposed on the inner wall of the upper die half 3011, the inner wall facing the cavity of the injection mold die 301, and the image sensor 303 may be disposed inside the through hole of the lower die half 3012, and adapted for obtaining the image of the glass 305 based on light irradiated by the light source 302 and penetrating through the glass 305.

In the embodiment shown in FIG. 5, the image of the glass 305 is detected, and whether the glass 305 breaks is determined based on the detected image. The detection result is visible, and the detection unit (i.e., the image sensor 303) is relatively simple and doesn't need to directly contact with the glass, which brings almost no influence on the surface of the glass 305.

Figure 6:
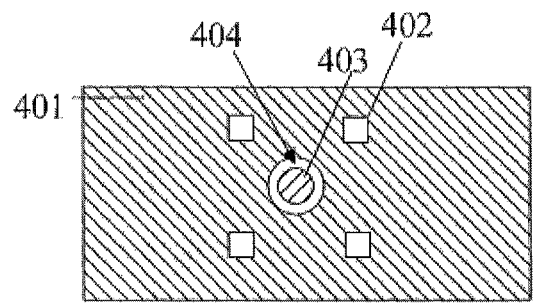
FIG. 6 schematically illustrates a diagram of an injection molding apparatus according to an embodiment of the present disclosure.

FIG. 6 schematically illustrates a diagram of an injection molding apparatus according to an embodiment of the present disclosure. Different from FIG. 5, there are a plurality of light sources 402 disposed on an inner wall of an injection mold die 401 and evenly distributed around a through hole 403.

The plurality of light sources 402 disposed in the above way may irradiate a glass evenly, such that an image sensor 404 in the through hole 403 may obtain an image of the glass with even brightness, which may enable the determination unit to determine glass breakage more accurately based on the image.

Figure 7:
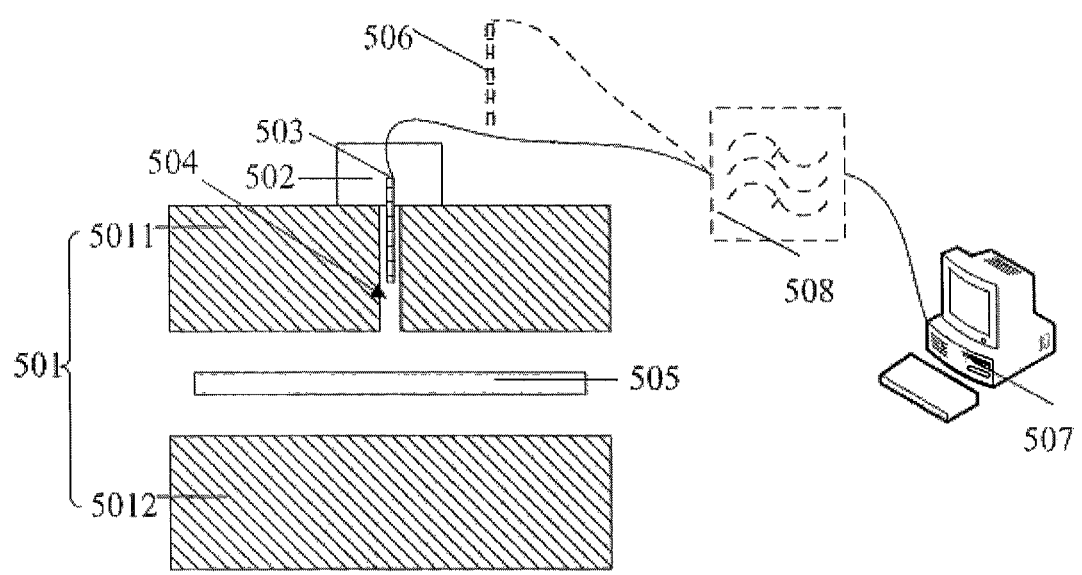
FIG. 7 schematically illustrates a diagram of an injection molding apparatus according to an embodiment of the present disclosure.

FIG. 7 schematically illustrates a diagram of an injection molding apparatus according to an embodiment of the present disclosure. Similarly with the embodiment shown in FIG. 2, whether a glass 505 breaks is determined based on detection of vibration of the glass 505. In FIG. 7, whether the glass 505 breaks is further determined based on detection of a sound generated by vibration of the glass 505.

In some embodiments, a detection unit in the injection molding apparatus is an acoustic sensor 503, which is adapted for converting a sound detected into an electric signal. In some embodiments, the acoustic sensor 503 may be mounted in an injection mold die 501.

The acoustic sensor 503 may be adapted for detecting various sounds in the injection mold die 501, and converting a detected sound into an electric signal. A sound generated when the glass 505 breaks has a particular frequency and a particular amplitude. And the acoustic sensor 503 can convert the vibration generated when the glass 505 breaks into an electric signal having a feature frequency and a feature amplitude.

The determination unit 507 may be coupled with the acoustic sensor 503 and adapted for determining whether the glass 505 breaks based on whether a sound detected by the acoustic sensor 503 matches with a sound of glass breaking. In some embodiments, the feature frequency and feature amplitude of the electric signal which correspond to the sound generated when the glass 505 breaks may be pre-stored in the determination unit 507. The determination unit 507 may be adapted for determining that the glass 505 breaks when the electric signal generated by the acoustic sensor 503 matches with the feature frequency and feature amplitude.

Referring to FIG. 7, the injection mold die 501 includes: an upper die half 5011 above the glass 505 and a lower die half 5012 below the glass 505, wherein the upper die half 5011 is configured with a through hole 504. The acoustic sensor 503 has one end disposed inside the injection mold die 501 and the other end disposed through the through hole 504 and coupled with the determination unit 507.

In some embodiments, the determination unit 507 may include: a receiver (not shown), coupled with the acoustic sensor 503, and adapted for receiving the electric signal generated by the acoustic sensor 503 and forming a time domain electric signal based on the received electric signal; a converter (not shown), coupled with the receiver, and adapted for converting the time domain electric signal into a frequency domain electric signal; and a comparator (not shown), coupled with the converter, and adapted for determining that the glass 505 breaks when the frequency domain electric signal is determined to be matched with the feature frequency and the feature amplitude of the sound generated when the glass 505 breaks. In some embodiments, the converter may be a Fourier transformation converter which can convert the time domain electric signal into the frequency domain electric signal.

In some embodiments, the comparator may be adapted for generating an alarm when it is determined that the glass 505 breaks. In some embodiments, the comparator may be coupled with an alarm bell, and adapted for sending an alarm signal to the alarm bell when the glass 505 breaks, to enable the alarm bell to generate an alarm in sound. In some embodiments, the comparator may be coupled with an alarm lamp, and adapted for sending an alarm signal to the alarm lamp when the glass 505 breaks, to enable the alarm lamp to generate an alarm in light.

As shown in FIG. 7, the receiver, the converter and the comparator may be integrated in a computer. In some embodiments, the receiver, the converter and the comparator may not be integrated in a computer.

Referring to FIG. 7, a sound insulation layer 502 may be filled in an end portion of the through hole 504, wherein the end portion is far away from a cavity of the injection mold die 501. The sound insulation layer 502 is adapted for sealing the acoustic sensor 503 in the injection mold die 501, such that the acoustic sensor 503 mainly detects sounds in the injection mold die 501, which may enable more accurate detection of a sound generated by vibration of the glass 505 and further increase the detection accuracy of glass breaking. In embodiments of the present disclosure, it is not limited how to seal the acoustic sensor 303. In some embodiments, the acoustic sensor 303 may be sealed in the injection mold die 501 in other ways.

Referring to FIG. 7, in some embodiments, the injection molding apparatus further includes an ambient sound detector 506 disposed outside of the injection mold die 501 and adapted for detecting ambient sounds, wherein the determination unit 507 is coupled with both the acoustic sensor 503 and the ambient sound detector 506, and adapted for determining whether the glass 505 breaks based on the difference between signals detected by the acoustic sensor 503 and the ambient sound detector 506.

The acoustic sensor 503 can detect not only the sounds in the injection mold die 501 but also ambient sounds outside the injection mold die 501. To exclude the influence the ambient sounds brings to the detection of glass breaking, the determination unit 507 may be adapted for removing the ambient sounds based on the ambient sounds detected by the ambient sound detector 506. In some embodiments, the ambient sounds detected by the ambient sound detector 506 have relatively large intensity, while the ambient sounds detected by the acoustic sensor 503 have relatively small intensity. The determination unit 507 may be adapted for: reducing an electric signal corresponding to the ambient sounds detected by the ambient sound detector 506; subtracting the reduced electric signal from an electric signal corresponding to the ambient sounds detected by the acoustic sensor 503 to obtain a subtracted electric signal; and determining whether the glass 505 breaks based on the subtracted electric signal. In this way, the determination accuracy may be improved.

Referring to FIG. 7, in some embodiments, a filter 508 may be disposed between the acoustic sensor 503 (or, the acoustic sensor 503 and the ambient sound detector 506) and the determination unit 507. The filter 508 may be adapted for filtering most noises except for those having the feature frequency of the sound of glass breaking, which may further improve the determination accuracy of glass breaking.

Figure 8:
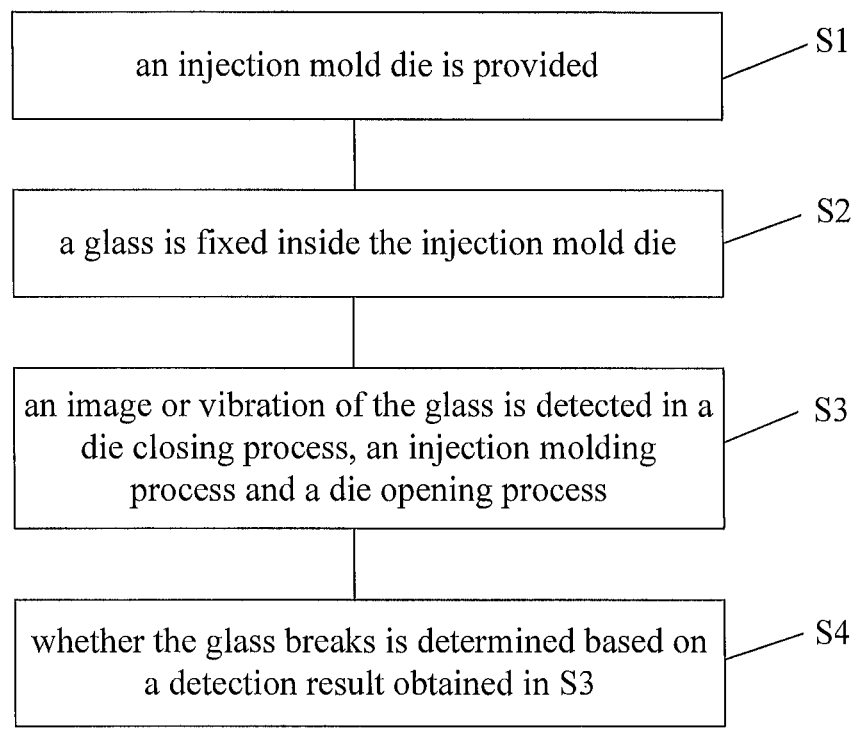
FIG. 8 schematically illustrates a flow chart of an injection molding method using an injection molding apparatus according to an embodiment of the present disclosure.

FIG. 8 schematically illustrates a flow chart of an injection molding method using an injection molding apparatus according to an embodiment of the present disclosure. The method is used to from a gasket around an edge of a glass and includes S1, S2, S3 and S4.

In S1, an injection mold die is provided.

In S2, a glass is fixed inside the injection mold die.

In S3, an image or vibration of the glass is detected in a die closing process, an injection molding process and a die opening process.

In S4, whether the glass breaks is determined based on a detection result obtained in S3.

The image or vibration of the glass is detected in the die closing process, the injection molding process and the die opening process, thus, whether the glass breaks can be determined based on the detection result. In this way, whether the glass disposed inside the injection mold die breaks is determined, such that the injection molding process may be terminated in time when it is determined that the glass breaks, and the risk of scratching the injection mold die by broken glass may be reduced.

In some embodiments, the image or vibration of the glass may be repeatedly detected in the die closing process, the injection molding process and the die opening process, respectively. Based on the repeated detection, information about whether to the glass breaks can be obtained for many times, and whether the glass breaks may be determined in time. In this way, the risk of scratching the injection mold die by the glass breaking may be further reduced, the time for repairing the injection mold die may be reduced, and a service life of the injection mold die may be prolonged.

Hereinafter, S1, S2, S3 and S4 are further described in detail in conjunction with embodiments of the present disclosure.

Referring to FIG. 5, in S1, an injection mold die 301 is provided, including an upper die half 3011 and a lower die half 3012.

In S2, a glass 305 is fixed inside the injection mold die 301. In some embodiments, the glass 305 is fixed between the upper die half 3011 and the lower die half 3012.

In S3, detecting an image of the glass 305 in a die closing process, an injection molding process and a die opening process may include: a light source 302 irradiating the glass 305; and repeatedly obtaining the image of the glass 305 illuminated by the reflected light or transmitted light of the light source 302.

In S4, determining whether the glass 305 breaks based on a detection result may include: determining whether the glass 305 breaks by comparing a current image of the glass 305 with a previous image of the glass 305.

In the above embodiment, the images of the glass 305 are detected and whether the glass 305 breaks is determined based on the detected images.

Instead, in some embodiments, vibration of the glass may be detected and whether the glass breaks is determined based on the detected vibration.

In some embodiments, in S3, vibration of the glass (as shown in FIG. 2) or a sound generated by the vibration of the glass (as shown in FIG. 7) is detected in a die closing process, an injection molding process and a die opening process.

Accordingly, in S4, whether the glass breaks is determined based on a detection result obtained in S3. Specifically, the vibration of the glass or the sound generated by the vibration of the glass is converted into a time domain electric signal, the time domain electric signal is converted into a frequency domain electric signal, and an alarm is generated when the frequency domain electric signal is determined to be matched with a feature frequency and a feature amplitude of a sound generated when the glass breaks.

Referring to FIG. 7, in some embodiments, detecting the sound generated by the vibration of the glass may include: detecting sounds not only in the injection mold die 501 but also outside the injection mold die 501. Determining whether the glass 505 breaks based on the detection result may include: determining whether the glass 505 breaks by comparing the sound in the injection mold die 501 with the sound outside the injection mold die 501. Therefore, the influence which ambient sounds outside the injection mold die 501 brings to the glass 505 may be reduced, and the detection accuracy of glass breaking may be improved.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure. Therefore, the protection scope of the present disclosure is subject to the scope defined by the claims.

What is claimed is:

1. An injection molding apparatus for forming a gasket around an edge of a glass, comprising:
   an injection mold die;
   at least one fixing component, disposed inside the injection mold die and adapted for fixing the glass inside the injection mold die;
   a detection unit, adapted for detecting sounds in the injection mold die; and
   a determination unit, coupled with the detection unit and adapted for determining whether the glass breaks based on a detection result of the detection unit;
   wherein the detection unit is an acoustic sensor;
   wherein the acoustic sensor has one end disposed inside a through hole of the injection mold die, in order to detect sounds inside the injection mold die;
   wherein the detection unit is adapted for determining whether the glass breaks based on whether a sound detected by the acoustic sensor matches with a sound of glass breaking;
   wherein a sound insulation layer is filled in an end portion of the through hole, and wherein the end portion is far away from a cavity of the injection mold die.

2. The injection molding apparatus according to claim 1, further comprising an ambient sound detector disposed outside of the injection mold die and adapted for detecting ambient sounds,
   wherein the determination unit is coupled with both the acoustic sensor and the ambient sound detector, and adapted for determining whether the glass breaks based on the difference between signals detected by the acoustic sensor and the ambient sound detector.

3. The injection molding apparatus according to claim 1, wherein the detection unit is configured to output an electric signal, and the determination unit comprises:
   a receiver, coupled with the detection unit, and adapted for receiving the electric signal and forming a time domain electric signal based on the received electric signal;
   a converter, coupled with the receiver, and adapted for converting the time domain electric signal into a frequency domain electric signal; and
   a comparator, coupled with the converter, and adapted for generating an alarm when the frequency domain electric signal is determined to be matched with a feature frequency and a feature amplitude of a signal generated when the glass breaks.

4. The injection molding apparatus according to claim 1, wherein part of the sound insulation layer is arranged on an external surface of the injection mold die.

5. The injection molding apparatus according to claim 1, further comprising a filter arranged outside the injection mold die and configured to filter noises except for those having a feature frequency of the sound of glass breaking.

* * * * *